(12) United States Patent
Sun et al.

(10) Patent No.: US 10,212,604 B2
(45) Date of Patent: Feb. 19, 2019

(54) SPECTRUM MANAGEMENT APPARATUS AND METHOD, AND APPARATUS AND METHOD FOR WIRELESS COMMUNICATION

(71) Applicant: Sony Corporation, Tokyo (JP)

(72) Inventors: Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/504,452

(22) PCT Filed: Sep. 11, 2015

(86) PCT No.: PCT/CN2015/089416
§ 371 (c)(1),
(2) Date: Feb. 16, 2017

(87) PCT Pub. No.: WO2016/062172
PCT Pub. Date: Apr. 28, 2016

(65) Prior Publication Data
US 2017/0311167 A1 Oct. 26, 2017

(30) Foreign Application Priority Data

Oct. 22, 2014 (CN) .......................... 2014 1 0569411

(51) Int. Cl.
*H04W 16/10* (2009.01)
*H04L 5/00* (2006.01)
(Continued)

(52) U.S. Cl.
CPC ........... *H04W 16/10* (2013.01); *H04L 5/0037* (2013.01); *H04W 16/14* (2013.01); *H04W 24/02* (2013.01);
(Continued)

(58) Field of Classification Search
CPC ... H04W 16/10; H04W 60/005; H04W 24/02; H04W 72/048; H04W 16/14; H04L 5/0037
See application file for complete search history.

(56) References Cited

U.S. PATENT DOCUMENTS

2011/0077042 A1* 3/2011 Stanforth ............. H04W 72/10
455/512
2011/0228666 A1 9/2011 Barbieri et al.
(Continued)

FOREIGN PATENT DOCUMENTS

| CN | 102812772 A | 12/2012 |
|---|---|---|
| CN | 102857972 A | 1/2013 |
| CN | 102917456 A | 2/2013 |

OTHER PUBLICATIONS

International Search Report dated Dec. 21, 2015 in PCT/CN2015/089416 filed Sep. 11, 2015.

*Primary Examiner* — Nathan Mitchell
(74) *Attorney, Agent, or Firm* — XSENSUS LLP

(57) ABSTRACT

A spectrum management apparatus and method, and an apparatus and method for wireless communication. The spectrum management apparatus includes: a determining unit, configured to determine an exclusive indicator of a high priority communications system that exists in a management range of the spectrum management apparatus, the exclusive indicator represents a range of the high priority communications system in space and/or frequency domains that is isolated from other communications systems; and an adjustment unit, configured to adjust the exclusive indicator when there are multiple exclusive indicators.

19 Claims, 6 Drawing Sheets

(51) Int. Cl.
*H04W 16/14* (2009.01)
*H04W 24/02* (2009.01)
*H04W 60/00* (2009.01)
*H04W 72/04* (2009.01)
*H04W 72/12* (2009.01)

(52) U.S. Cl.
CPC ....... *H04W 60/005* (2013.01); *H04W 72/048* (2013.01); *H04W 72/1247* (2013.01)

(56) References Cited

U.S. PATENT DOCUMENTS

| | | | |
|---|---|---|---|
| 2012/0014332 A1* | 1/2012 | Smith | H04W 16/14 370/329 |
| 2014/0120940 A1* | 5/2014 | Ren | H04W 28/16 455/454 |
| 2014/0148191 A1 | 5/2014 | Feng et al. | |
| 2014/0237547 A1* | 8/2014 | Bose | H04W 52/367 726/3 |
| 2014/0315561 A1* | 10/2014 | Hooli | H04W 16/14 455/450 |
| 2015/0119059 A1* | 4/2015 | Miao | H04W 16/10 455/452.1 |
| 2017/0280399 A1* | 9/2017 | Chrisikos | H04W 52/243 |

* cited by examiner

SPECTRUM MANAGEMENT APPARATUS AND METHOD, AND APPARATUS AND METHOD FOR WIRELESS COMMUNICATION

FIELD OF THE INVENTION

The embodiments of the present disclosure generally relates to the field of wireless communications, and in particular to a spectrum management apparatus and method and an apparatus and method for wireless communications. More particularly, the embodiments of the present disclosure relates to technology for optimizing network spectrum usage efficiency in the case that communication systems having different priority levels operate in a same frequency band.

BACKGROUND OF THE INVENTION

With development of wireless communication technology, demands of a user for high quality, a high speed, a new service is higher and higher. A wireless communication operator and a device manufacturer should continuously improve a system to meet the demands of the user. In this case, a large amount of spectrum resources are required to support the new service arising continuously, and to meet requirements of high-speed communications, the spectrum resources may be quantized with a parameter such as time, frequency, band width, allowable maximum emitting power.

Currently, limited spectrum resources have been allocated to fixed operators and services, new available spectrum is very rare or expensive. In this case, a concept of dynamic spectrum usage is proposed, that is, frequency resources which have been allocated to certain services but are not utilized sufficiently are utilized dynamically. For example, it is pointed out in the usage specification for a frequency band of 3.5 GHz currently proposed by the Federal Communication Commission that the frequency band of 3.5 GHz is licensed to a radar system, and civil communication systems can make use of the frequency band of 3.5 GHz on the premise of protecting the radar system, and the civil communication systems may include be classified two kinds of systems with high spectrum priority level and with low spectrum priority level.

Therefore, it is desired to provide a manner in which communication systems having different spectrum priority levels can reasonably utilize the spectrum resources.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

A spectrum management apparatus is provided according to an aspect of the present disclosure, which includes: a determining unit, configured to determine an exclusive index for a high priority level communication system existing within a management range of the spectrum management apparatus, wherein the exclusive index represents a range of isolation of the high priority level communication system from other communication systems in space and/or in frequency domain; and an adjusting unit, configured to, in the case that there are a plurality of exclusive indexes, adjust the exclusive indexes.

A spectrum management method is provided according to another aspect of the present disclosure, which includes: determining an exclusive index for a high priority level communication system existing within a management range, wherein the exclusive index represents a range of isolation of the high priority level communication system from other communication systems in space and/or in frequency domain; and in the case that there are a plurality of exclusive indexes, adjusting the exclusive indexes.

An apparatus for wireless communications is provided according to another aspect of the present disclosure, which includes: a receiving unit, configured to receive available spectrum resources and an exclusive index for a communication system where the apparatus for wireless communications is located from a spectrum management apparatus, wherein the exclusive index is the number N of exclusive systems for the communication system where the apparatus is located, wherein the first N communication systems which produce maximum interferences on the communication system where the apparatus is located are forbidden to make use of spectrum resources in a same frequency band as the available spectrum resources, where $N \geq 1$; and a determining unit, configured to determine an interference neighbor list of the communication system, and determine the exclusive systems based on the interference neighbor list and the exclusive index.

A method for wireless communications is provided according to an aspect of the present disclosure, which includes: receiving available spectrum resources and an exclusive index for a target communication system from a spectrum management apparatus, wherein the exclusive index is the number N of exclusive systems for the target communication system, wherein the first N communication systems which produce maximum interferences on the target communication system are forbidden to make use of spectrum resources in a same frequency band as the available spectrum resources, where $N \geq 1$; and determining an interference neighbor list of the target communication system, and determining the exclusive systems based on the interference neighbor list and the exclusive index.

According to other aspects of the present disclosure, there are also provided computer program codes and computer program products for implementing the above mentioned spectrum management method and the method for wireless communications and a computer readable storage medium in which computer program codes for implementing the above spectrum management method and the method for wireless communications are recorded.

With the spectrum management apparatus and method according to the present disclosure, exclusive indexes are adjusted in the case that there are multiple exclusive indexes, spectrum resources are utilized more sufficiently while ensuring communication quality of the high priority level communication system, thereby improving spectrum usage efficiency. In addition, the high priority level communication system can be protected more effectively by using a new exclusive index. The exclusive systems are determined dynamically with the apparatus and method for wireless communications according to the present disclosure, and the spectrum resources can be utilized sufficiently while ensuring the communication quality.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF EMBODIMENTS

Figure 1:
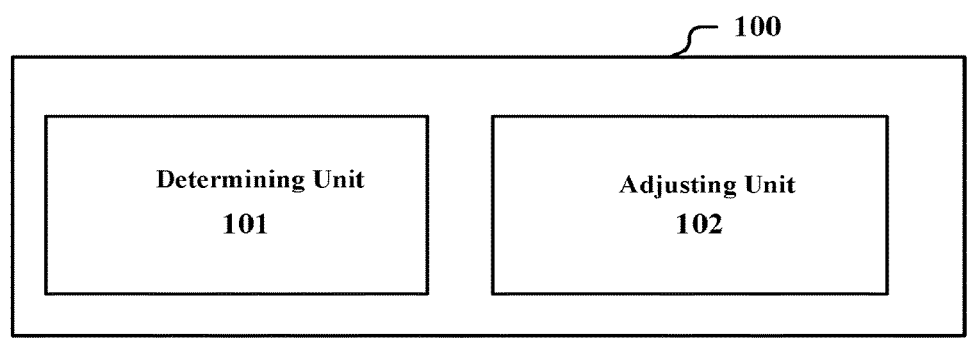
FIG. 1 is a structural block diagram of a spectrum management apparatus according to an embodiment of the present disclosure.

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

Cognitive Radio System

A cognitive radio system where a spectrum management apparatus according to the present disclosure is located is described simply first. Normally, the cognitive radio system includes a primary system and a secondary system. The primary system is a system licensed to the usage of the spectrum, for example, the radar system described in the background part, and the primary system may include multiple users (primary users). The secondary system may be a system such the civil communication system described above, which is not licensed to the usage of the spectrum and can only make opportunistic use of the spectrum to perform communication in the case that the primary system does not make use of the spectrum or in the case that interferences on the primary system are within a predetermined range (under the condition of making use of the spectrum without affecting the normal operation of the primary system). The secondary system may include multiple users (secondary users). Alternatively, the secondary system may also be a system licensed to the usage of the spectrum, however, the secondary system has a lower priority level than that of the primary system in terms of usage of the spectrum. For example, in the case that a new base station is deployed by the operator to provide a new service, an existing base station and a service provided thereby are taken as a primary system and have a spectrum usage priority.

As an application example, the cognitive radio system includes a broadcast and television system and a wifi communication system. Specifically, the broadcast and television spectrum itself is allocated to the broadcast and television system, therefore, the broadcast and television system is a primary system, and may include a primary user base station (for example, a television tower) and multiple primary users (for example, televisions). The wifi communication system is a secondary system, and may each include a secondary user base station (for example, a wifi access point) and a secondary user (for example, a portable computer). In the cognitive radio system, spectrum of a channel, on which no program is played or spectrum of an adjacent channel on the digital broadcast and television spectrum can be utilized dynamically to perform wifi communication, without interfering with the television signal reception.

Specifically, a UHF frequency band is allocated to the broadcast and television service, therefore, the broadcast and television system has the highest priority level in the UHF frequency band, and is a primary system. In addition, spectrum resources in the UHF frequency band, which are not used by the broadcast and television system during a certain time period or within a certain area, can be allocated to the other communication system such as the wifi communication system described above or a mobile communication system.

In the communication manner in which the primary system and the secondary system coexist, it is required that an application of the secondary system does not have a adverse effect on an application of the primary system, alternatively, an influence of spectrum usage of the secondary system can be controlled to be within an allowable range of the primary system. In the case that the influence on the primary system is within a certain range, that is, does not exceed an interference threshold of the primary system, resources of the primary system usable by the secondary systems can be allocated to multiple secondary systems.

It should be understood by those skilled in the art that a case that the primary system is the radar system or the broadcast and television system is described above, however, the present disclosure is not limited thereto. The primary system may be the other communication system having a legal usage right of spectrum, for example, a mobile communication system, and the secondary system may also be the other system which needs to use the spectrum resources to perform communication, for example, an intelligent meter reading system.

Since the secondary system opportunistically accesses to the spectrum resources of the primary system, a current research emphasis in the existing technology is to protect the primary system, and a main manner is to store coverage information of the primary system in a database. An allowable interference limit of the primary system is also stored in the database. Before a secondary system in the same area as the primary system begins to make use of spectrum of the primary system, the secondary system first accesses the database and submits state information, such as location information, spectrum emission mask, transmission band width, a carrier frequency and the like, of the secondary system. Then, the database calculates interferences amount of the secondary system on the primary system based on the state information of the secondary system, and calculates, based on the calculated interferences amount of the secondary system on the primary system in the current state, expected usable spectrum resources of the secondary system in a current state.

A content of the present disclosure is described below in the embodiments.

First Embodiment

FIG. 1 is a structural block diagram of a spectrum management apparatus 100 according to an embodiment of the present disclosure, the spectrum management apparatus 100 includes: a determining unit 101, configured to determine an exclusive index of a high priority level communication system existing within a management range of the spectrum management apparatus 100, wherein the exclusive index represents a range of isolation of the high priority level communication system from other communication systems in space and/or in frequency domain; and an adjusting unit 102, configured to, in the case that there are a plurality of exclusive indexes, adjust the exclusive indexes.

As described above, in the case that licensed spectrum resources are utilized by communication systems dynamically, the communication system such as a secondary system may have a high spectrum priority level or a low spectrum priority level. Specifically, it is proposed by the inventor of the present disclosure that an exclusive index can be applied to forbid a low priority level communication system to use a same frequency band as a high priority level communication system such as a high priority level secondary system within a range covered by the exclusive index of the high priority level communication system, thereby protecting the high priority level communication system, and ensuring communication quality of the high priority level communication system, for example, realizing QoS or spectrum usage efficiency desired by the high priority level communication system.

For example, a communication system managed by the spectrum management apparatus 100 may be a cognitive communication system which makes opportunistic use of unlicensed spectrum. A priority level of each communication system may be determined based on a type of an application. For example, a high priority level can be allocated to a communication system for emergence purpose. Alternatively, the priority level can be determined according to a level of communication cost paid by a secondary system user, which is exemplified in the present disclosure and is not limited.

Figure 2:
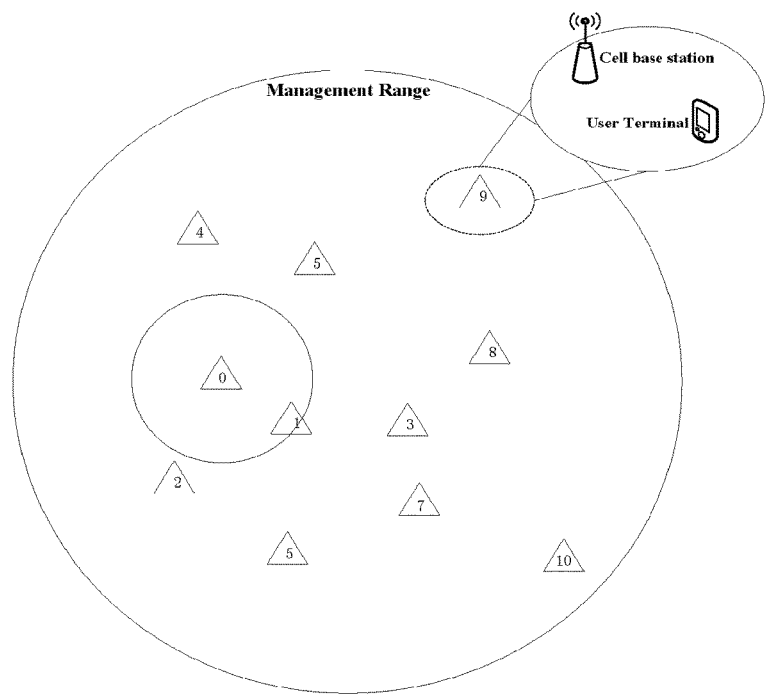
FIG. 2 is a schematic diagram of a distribution of communication systems within a management range of a spectrum management apparatus.

FIG. 2 is a schematic diagram showing multiple communication systems existing in the management range of the spectrum management apparatus 100. Specifically, each communication system is shown with a triangle, and represented by a number identified in the triangle. Each communication system may be a service cell composed of a base station and a user terminal (for example, the communication system 9, as shown in detail in an ellipse at an upper right corner of FIG. 2), and may also be communication pairing (D2D) composed of multiple terminals. D2D communication is a communication manner in which communication is performed directly between terminals with spectrum resources of a cell. The communication systems all can use the same frequency band, but have different spectrum usage priority levels, respectively. For example, a small base station which is deployed in a hot spot region by a mobile operator and provides broadband download for a user may be set to have a high priority level, and the other civil systems such as a household wireless network may be set to have a low priority level. In practice, types of the communication systems and the setting of priority levels are not limited thereto. The communication system may also include for example interconnection between user phones, Internet of things, an environment monitoring system and the like.

The exclusive index may have multiple formats, and is actually a protection index, for achieving isolation of the high priority level communication system from the other low priority level communication system in deployment space and/or in frequency domain of spectrum usage. The isolation refers to spacing of the high priority level communication system from the low priority level communication system in space or in frequency domain, that is, a range, in which the low priority level communication system is not allowed to make use of the spectrum resources, is set around a position in space or in frequency domain of the high priority level communication system. The protection index aims to protect the high priority level communication system, so as to realize desired communication quality thereof. As an example, the exclusive index may be an exclusive region in space based on a geographical position. Other communication systems in the exclusive region are forbidden to use spectrum resources in a same frequency band as the high priority level communication system. For example, in FIG. 2, the determining unit 101 determines a range defined by a circle around communication system 0 as an exclusive region of communication system 0, and other communication systems in the exclusive region are forbidden to make use of the same frequency band as the communication system 0 to perform communication. Specifically, the determining unit 101 may calculate the size of the exclusive region according to the geographical position based on a distribution of the existing systems, and an aggregated interferences (that is, a total effect of interferences) produced by communication systems at the edge of the exclusive region when operating on the same frequency band as the high priority level communication system and other communication systems will not prevent the high priority level communication system to be protected from realizing the desired communication quality thereof at least. Specifically, calculation methods for the aggregated interferences at a position and an aggregated interference threshold are known, which are not described repeatedly here anymore.

In the case that there are multiple exclusive regions since multiple high priority level communication systems within the management range make use of the spectrum resources, the exclusive regions each calculated considering only one communication system may be too large, and therefore, the spectrum resources are not utilized sufficiently. It is because that the number of low priority level communication systems is reduced in the case that there are multiple high priority level communication systems, compared with the case that there is only one high priority level communication system, so that an aggregated interferences of the low priority level communication systems on the high priority level communication systems are reduced. Therefore, the adjusting 102 may reduce the size of the exclusive region. In this way, the number of the low priority level communication systems which make use the same frequency band to perform communication is increased as much as possible on the premise of ensuring the communication quality of the high priority level communication systems, thereby improving usage efficiency of the spectrum resources.

In addition, based on the exclusive region, the exclusive index may further include a frequency band (referred to as an exclusive frequency band hereinafter) which is defined in frequency domain and differs by a predetermined frequency range from a frequency used by the high priority level communication system. Communication systems within the exclusive region in space are forbidden to make use of spectrum resources in the defined frequency band. For example, in the case that multiple communication systems are closely adjacent in position, and it is difficult to ensure the communication quality of the high priority level communication system only by the exclusive region in space, the exclusive frequency band described above may be set in frequency domain, to further reduce interferences of the other communication systems on the high priority level communication system.

However, in actual communications, the interferences the communication system being subjected to are affected not only by the geographical position but also by a transmission model. For example, the transmission model reflects path loss in consideration of various influence factors. For example, a system close to the other systems in geographical position may not affect the other systems since a building is located around the system, and thus, the system is not forbidden to make use of same spectrum resources as a high priority level communication system even in the case that the system is located within an exclusive region of the high priority level communication system. In other words, the setting of exclusive region based on the geographical position described above is not the most efficient ideally in some cases.

Therefore, as another example, the exclusive index may be the number N of exclusive systems. Specifically, the first N communication systems which produce maximum interferences on the high priority level communication system are forbidden to make use of spectrum resources in a same frequency band as the high priority level communication system, where $N \geq 1$.

Specifically, the number N of exclusive systems may be acquired based on a stochastic model of a distribution of positions of the communication systems and desired spectrum usage efficiency of the high priority level communication system. With reference to FIG. 2, with taking any point within the management range as an origin point, a distribution density function for a distance between the origin point and adjacent neighboring nodes around the origin point (that is, the communication system) is shown as formula (1) as follows.

$$f_{d_n}(x) = e^{-\lambda \Phi x^2} \frac{2(\lambda \Phi x^2)^n}{x \Gamma(n)} \quad (1)$$

Where $d_n$ is a distance from the origin point to a n-th neighboring node (ranked from near to far). For example, in FIG. 2, taking the communication system 0 as the origin point, a distance from the communication system 0 to the communication system 1 is $d_1$. $\lambda$ is a density of communication systems within the management range, that is, a value obtained by dividing the total number of the communication systems by the area of the management range. $\Phi$ is an angle of the management range, and ranges from 0 to $\pi$, $\Phi$ is equal to $\pi$ in the case that the management range is in a shape of circle, $\Gamma(n)$ is the Gamma function, that is, $\Gamma(n)=n!$. The interferences that the communication system 0 receives from the n-th neighbor can be represented with a formula (2) as follows.

$$I_n = G_n P_n \quad (2)$$

Where $G_n$ is a path gain from the n-th neighbor of communication system 0 to communication system 0, and $10 \log 10(G_n)$ follows the Gaussian Distribution having a mean value of $10 \log 10 d_n^{-\alpha}$ and a variance of $\sigma^{-2}$. $P_n$ is emitting power of the n-th neighbor, and a is a path transmission loss index. According to the formula described above, a mathematical model can be established for the interferences from the n-th neighbor, and interferences are ranked according to the size of the interferences to establish an interference neighbor list, so that $I_k \geq I_{k+1}, 1 \leq k \leq M-2$, where M is the total number of communication systems within the management range. The aggregated interferences on communication system 0 is calculated according to formula (3) as follows:

$$I = \sum_{k=1}^{M-1} I_k \quad (3)$$

In the case that the exclusive index is the number N of the exclusive systems, the first N communication systems of the interference neighbor list are forbidden to make use of the same frequency band as communication system 0. Therefore, the interferences on the communication system 0 are calculated according formula (4) as follows in the case that the exclusive index is implemented.

$$I(N) = \sum_{k>N}^{M-1} I_k \quad (4)$$

Where N ranges from 1 to M−1. A distribution of the interferences I(N) is acquired according to formula (4) described above assuming that the communication systems are distributed within a certain region randomly, and N is calculated according to the desired spectrum usage efficiency of the high priority level communication system. For example, the desired spectrum usage efficiency may be a highest overflow probability U, and an allowable highest interferences $I_{max}$ of a system can be calculated based on expected emission power, a service range, a lowest signal to interference ratio of a receiver of the system. N can be calculated according to formula (4), so that a probability of $I(N) > I_{max}$ is less than U. In other words, the n-th neighbor and the neighbors after it can use the same spectrum resources as the high priority level communication system.

The exclusive system parameter N described above can be determined by the determining unit 101. Similar to the case that the exclusive region is used as the exclusive index, in the case that a new exclusive index is to be implemented, the aggregated interferences of the low priority level communication systems on the high priority level communication system are reduced since the number of the low priority level communication systems is reduced, and the adjusting unit 102 can reduce the exclusive system parameter N correspondingly.

In an example, the spectrum management apparatus 100 may also create and maintain, based on geographical positions of all communication systems within the management range of the spectrum management apparatus 100, an interference neighbor list for each high priority level communication system, and determine, based on the interference neighbor list, the exclusive systems involved by the exclusive index, wherein the communication systems are ranked in a descending order in accordance with interferences of the communication systems on the high priority level communication system in the interference neighbor list, and each communication system is stored in association with a priority level of the communication system in the interference neighbor list.

As a supplement, the exclusive index may further include a frequency band which is defined in frequency domain and differs by a predetermined frequency range from a frequency used by the high priority level communication system. Specifically, the first N communication systems which produce maximum interferences on the high priority level communication system are forbidden to make use of spectrum resources on the defined frequency band. Specifically, the predetermined frequency range can be represented by an integer multiple of a predefined frequency interval.

It should be understood that, although the exclusive frequency band defined in frequency domain is used as a supplement for one of the exclusive region or the number of exclusive systems, only the exclusive frequency band in frequency domain may also be set to protect the high priority level communication system, that is, other communication systems within the management range are forbidden to make use of a frequency band which differs by the predetermined frequency range from the frequency used by the high priority level communication system. Similarly, when the adjusting unit 102 adjusts, in the case that there are multiple exclusive frequency bands, the exclusive frequency bands, for example, a range of the defined exclusive frequency bands may be reduced.

As described above, in the case that the spectrum resources are used by multiple high priority level communication systems, in order to improve usage efficiency for the spectrum resources, the adjusting unit 102 adjusts an exclusive index of each of the high priority level communication systems dynamically. For example, the adjusting unit 102 may be configured to adjust the exclusive index according to at least one of desired spectrum usage efficiency of the high priority level communication system and overall network capacity within the management range.

In the case that the exclusive index is adjusted based on the desired spectrum usage efficiency of the high priority level communication system, with the goal of realizing the desired spectrum usage efficiency of the high priority level communication system, the exclusive index is adjusted depending on variation of actual cases. For example, in the case that a new high priority level communication system is to join, an existing low priority level communication system may be located within a new exclusive region or belong to the first N communication systems which produce maximum interferences, and the existing low priority level communication system is forbidden to make use of the frequency band. Therefore, the number of low priority level communication systems which make use of the frequency band may be reduced, and thus the aggregated interferences are reduced. Correspondingly, the adjusting unit 102 may reduce the size of the exclusive region or reduce the number of exclusive systems. Alternatively, in the case that a high priority level communication system stops using the frequency band, the exclusive index is abolished, and the low priority level communication system which is forbidden to perform communication can make use of the frequency band again, thereby increasing interferences on the high priority level communication which continues making use of the frequency band. Correspondingly, the adjusting unit 102 may increase the size of the exclusive region or increase the number of exclusive systems.

In another aspect, since the overall network capacity within the management range is the sum of capacity of the high priority level communication systems and capacity of the low priority level communication systems, too much reduction of the number of low priority level communication systems to protect the high priority level communication system would degrade the overall network capacity within the management range. In view of this, the adjusting unit 102 may adjust the exclusive index in terms of the overall network capacity, for example, to maintain the overall network capacity to be above a certain threshold. The high priority level communication system described herein may be determined based on a service type and/or service quality of the communication system, and the high priority level thereof is realized by preferentially ensuring spectrum resource usage of the high priority level communication system. For example, the service type may include performing emergency communication, a high level of cost paid by the user and so or as described above, and the service quality may include having QoS guarantee and so on.

In summary, in the case that there are multiple exclusive indexes, the spectrum management apparatus 100 adjusts the exclusive indexes dynamically, so as to be adapted to an actual network operating state, and avoid excessive limitation on the low priority level communication systems. Therefore, overall spectrum usage efficiency is improved while ensuring the spectrum usage by the high priority level communication system. In addition, by taking the number of exclusive systems based on the interference neighbor list as the exclusive index, not only the geographical position of the communication system but also the transmission model is considered, so that the exclusive system which is forbidden to make use of the same frequency band as the high priority level communication system is determined more accurately and efficiently.

Second Embodiment

Figure 3:
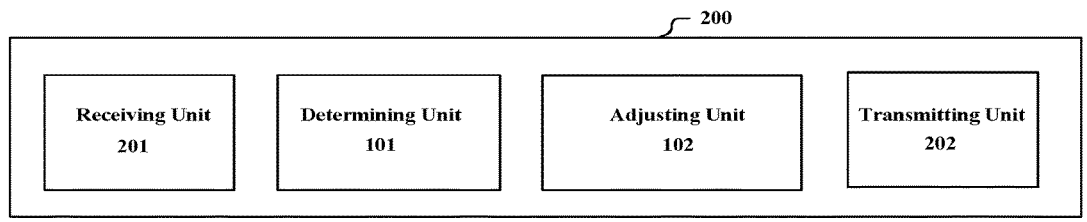
FIG. 3 is a structural block diagram of a spectrum management apparatus according to another embodiment of the present disclosure.

FIG. 3 is a structural block diagram of a spectrum management apparatus 200 according to another embodiment of the present disclosure. Besides the components of the spectrum management apparatus 100 described with reference to FIG. 1, the spectrum management apparatus 200 further includes: a receiving unit 201, configured to receive a request for making use of spectrum resources from a first communication system, wherein the determining unit 101 determines an exclusive index for the first communication system in response to the request in the case that the first communication system is a high priority level communication system; and a transmitting unit 202, configured to transmit available spectrum resources and the exclusive index for the first communication system to the first communication system.

In an example, the request from the first communication system includes multiple sets of system parameter settings, and the determining unit 101 selects to use, based on exclusive indexes of the other high priority level communication systems, a set of system parameter settings, with which it is most probable to acquire the spectrum resources. The transmitting unit 202 transmits information indicating the selection to the first communication system. For example, the system parameter settings may refer to the configuration used when the communication system performs communication.

Here, the system parameter settings may include at least one of an antenna pattern, a transmission mask, a modulation type and desired spectrum usage efficiency. Different system parameter settings represent different ways of using the spectrum resources by the first communication system, for example, the different numbers of used spectrum resources. The determining unit 101 may select, based on an exclusive index of an existing high priority level communication system, a most probable way of using the spectrum resources by the first communication system.

In the case that the first communication system is a low priority level communication system, the spectrum management apparatus 200 does not need to determine the exclusive index, and just needs to determine whether the low priority level communication system is located within a range of the exclusive index of the existing high priority level communication system. The spectrum management apparatus 200 rejects the request for using the spectrum resources if the low priority level communication system is located within the range of the exclusive index of the existing high priority level communication system, and otherwise allocates available spectrum resources to the low priority level communication system and allows the low priority level communication system to make use of the spectrum resources to perform communication.

In the case that the first communication system is a high priority level communication system, the spectrum management apparatus 200 needs to determine an exclusive index for the first communication system, and the transmitting unit transmits information about available spectrum resources and the exclusive index to the first communication system.

It should be understood that the exclusive index can be implemented by the spectrum management apparatus or the first communication system. Specifically, an example in which the exclusive index is implemented by the first communication system is described in a subsequent embodiment.

In the case that the exclusive index is implemented by the spectrum management apparatus, the spectrum management apparatus 200 determines an exclusive system based on the exclusive index for the first communication system. In the case that the exclusive index for the first communication system involves the existing high priority level communication system, and/or the exclusive index of the existing high priority level communication system involves the first communication system, the transmitting unit 202 is further configured to notify the first communication system that the exclusive index for the first communication system cannot be implemented.

For example, in the case that the exclusive index is the size of an exclusive region, when there is a high priority level communication system performing communication within the exclusive region of the first communication system determined by the determining unit 101, or the first communication system is located within an exclusive region of the existing high priority level communication system, it implies that the exclusive region of the first communication system cannot be implemented. The transmitting unit 202 notifies the first communication system of the information about the exclusive region being unable to be implemented.

In addition, in the case that the exclusive index is the number of exclusive systems, when there is a high priority level communication system performing communication within the exclusive systems of the first communication system determined by the determining unit 101, it implies that the exclusive index for the first communication system cannot be implemented. The transmitting unit 202 notifies the first communication system of information about the exclusive index being unable to be implemented. It should be noted that, since interferences between systems are mutual, the case that the exclusive systems of the first communication system includes the high priority level communication system performing communication also expresses the meaning that the first communication system is one of exclusive systems of the high priority level communication system performing communication. In this case, the spectrum management apparatus 200 may create and maintain an interference neighbor list as described above, and determine an exclusive system involved with the first communication system based on the interference neighbor list.

In another aspect, in the case that the exclusive index for the first communication system involves an existing low priority level communication system, the transmitting unit 202 transmits to the low priority level communication system an instruction to adjust spectrum resources used by the low priority level communication systems. In this way, the exclusive index for the first communication system is implemented, and the first communication system can make use of the acquired available spectrum resources to perform communication.

In the case that the exclusive index for the first communication system is implemented, and there are multiple exclusive indexes within the management range, the adjusting unit 102 adjusts the exclusive indexes according to for example the principle described in the first embodiment, to increase the number of low priority level communication systems as much as possible, thereby improving spectrum usage efficiency.

In the case that the exclusive index is implemented by the first communication system, the transmitting unit 202 is further configured to transmit information about the existing high priority level communication systems to the first communication system, so that the first communication system determines whether the exclusive index for the first communication system can be implemented. For example, the exclusive index for the first communication system can be implemented in the case that the exclusive index for the first communication system does not involve any existing high priority level communication system and the first communication system does not involve the exclusive index of any existing high priority level communication system.

Figure 4:
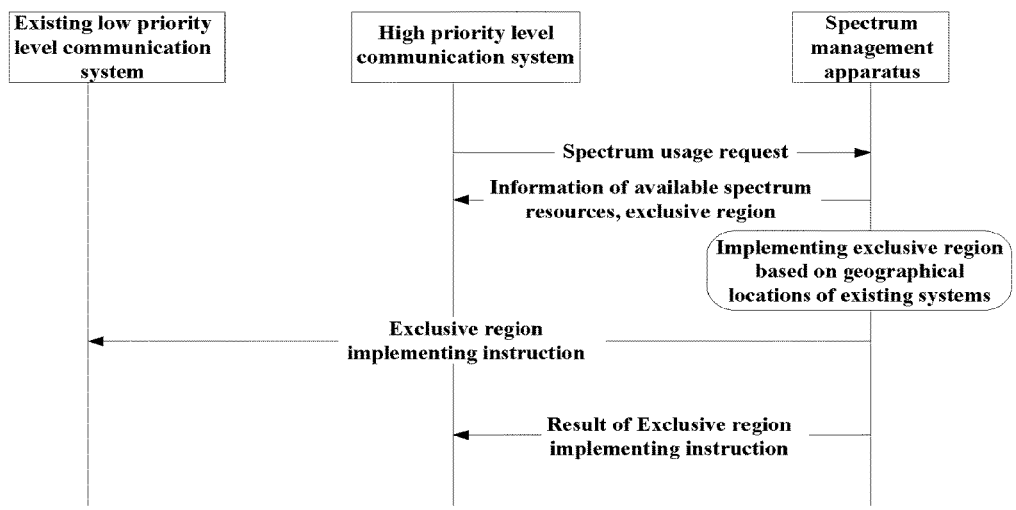
FIG. 4 is a schematic diagram of information interaction when a high priority level communication system requests to use spectrum resources to a spectrum management apparatus.
Figure 5:
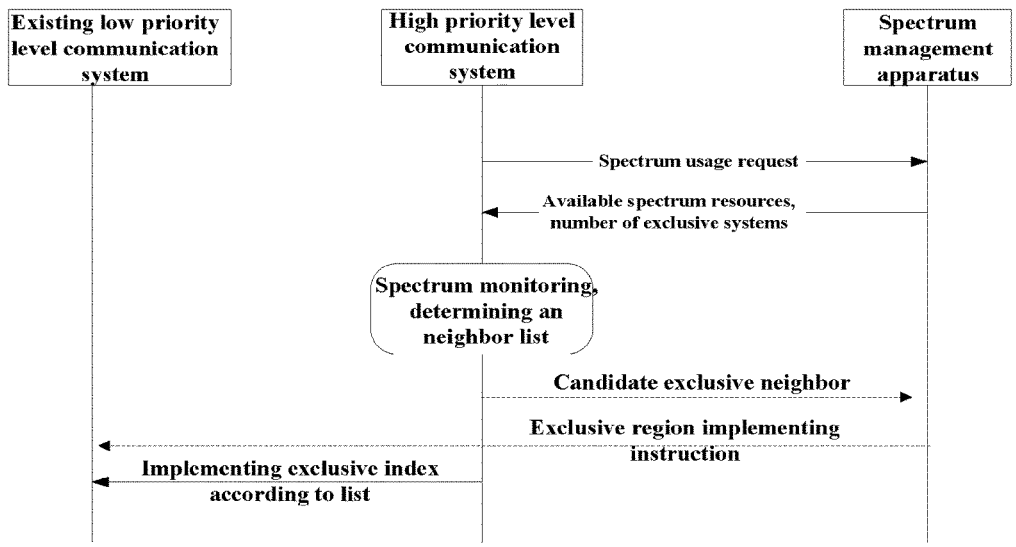
FIG. 5 is another schematic diagram of information interaction when a high priority level communication system requests to use spectrum resources to a spectrum management apparatus.

FIG. 4 and FIG. 5 show schematic diagrams of information interaction when the high priority level communication system requests to use spectrum resources to the spectrum management apparatus. An exclusive region based on a geographical position is used as an exclusive index in FIG. 4, the number of exclusive systems is used as an exclusive index in FIG. 5. It should be noted that examples are shown in FIG. 4 and FIG. 5, for ease of understanding.

In FIG. 4, the spectrum management apparatus (200) receives a spectrum usage request from a high priority level communication system, and determines available spectrum resources based on a system parameter of the high priority level communication system. The spectrum management apparatus (200) determines an exclusive region for the high priority level communication system, and then transmits information about the available spectrum resources and the exclusive region to the high priority level communication system. Also, the spectrum management apparatus implements the exclusive region based on a geographical position of the existing system, for example, transmits to an existing low priority level communication system an instruction to adjust spectrum usage of the existing low priority level communication system within the exclusive region. The spectrum management apparatus may also transmit a result of the instruction to implement the exclusive region to the high priority level communication system.

In FIG. 5, similar to FIG. 4, the spectrum management apparatus (200) receives the spectrum usage request and transmits information about the available spectrum resources and exclusive information such as information about the number of exclusive systems to the high priority level communication system. The high priority level communication system then performs spectrum monitoring to determine an interference neighbor list, and implements the exclusive index based on the interference neighbor list. A neighbor here refers to a communication system which is located in the vicinity of a certain communication system and is known by the certain communication system. Therefore, FIG. 5 shows an example in which the exclusive index is implemented by the high priority level communication system. Optionally, as dotted-line interaction signaling shown in FIG. 5, the high priority level communication system determines a candidate exclusive neighbor based on the number of exclusive systems after acquiring the interference neighbor list. The candidate exclusive neighbor is a communication system, on which an exclusive operation may be performed, in the interference neighbor list. The high priority level communication system reports information about the candidate exclusive neighbor to the spectrum management apparatus, and the exclusive index is still implemented by the spectrum management apparatus. For example, the spectrum management apparatus determines whether an exclusive operation can be performed based on a priority level of the candidate exclusive neighbor, and the candidate exclusive neighbor is commanded to stop operating on the frequency band of the high priority level communication system in the case that the exclusive operation can be performed. The spectrum monitoring and the like will be described in detail hereinafter.

It should be noted that since a geographical position of each communication system may be changed with a change in an application of the communication system, for the exclusive region based on the geographical position, the communication system should perform information interchange with the spectrum management apparatus in the case that a change in the position of the communication system exceeds a certain range, so as to ensure that the available spectrum resources are valid. For the number of exclusive systems, the communication system should periodically monitor surrounding communication systems to determine the neighbor list, so as to determine effective implementation of the exclusive index.

Third Embodiment

In the process of describing the spectrum management apparatus in the embodiments described above, obviously, some processing and methods are also disclosed. Hereinafter, an overview of the methods is given without repeating some details disclosed above. However, it should be noted that, although the methods are disclosed in a process of describing the spectrum management apparatus, the methods do not certainly employ or are not certainly executed by the aforementioned components. For example, the embodiments of the spectrum management apparatus may be partially or completely implemented with hardware and/or firmware, the spectrum management method described below may be executed by a computer-executable program completely, although the hardware and/or firmware of the spectrum management apparatus can also be used in the methods.

Figure 6:
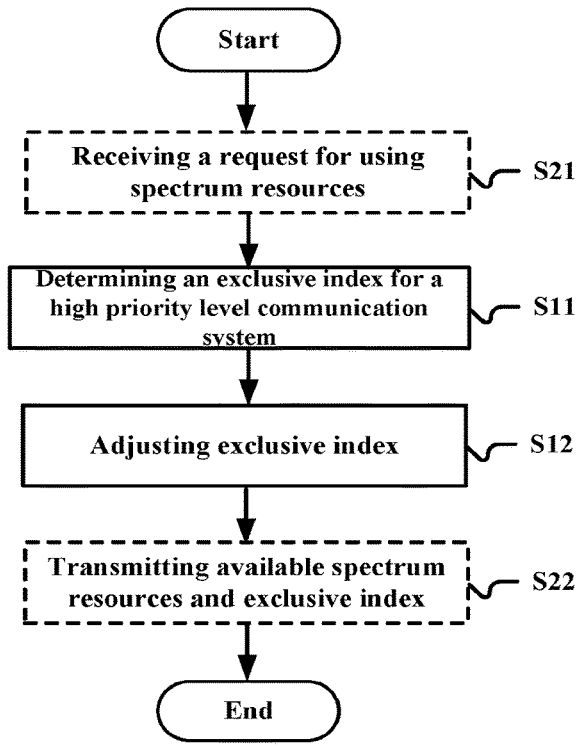
FIG. 6 is a flowchart of a spectrum management method according to an embodiment of the present disclosure.

FIG. 6 shows a flowchart of a spectrum management method according to an embodiment of the present disclosure. The method includes: determining an exclusive index for a high priority level communication system existing within a management range (S11), wherein the exclusive index represents a range of isolation of the high priority level communication system from other communication systems in space and/or in frequency domain; and in the case that there are multiple exclusive indexes, adjusting the exclusive indexes (S12).

As an example, the exclusive index may be an exclusive region in space based on a geographical position. Other communication systems within the exclusive region are forbidden to make use of spectrum resources in a same frequency band as the high priority level communication system. In the case that the exclusive index is used, since aggregated interferences of low priority level communication systems are reduced when there are multiple exclusive regions, the size of the exclusive regions can be reduced in step S12.

Individually or as a supplement to the exclusive region, the exclusive index may further include a frequency band which is defined in frequency domain and differs by a predetermined frequency range from a frequency used by the high priority level communication system. Communication systems within the exclusive region in space are forbidden to make use of spectrum resources in the defined frequency band.

As another example, the exclusive index may be the number N of exclusive systems. Specifically, the first N communication systems which produce maximum interferences on the high priority level communication system are forbidden to make use of spectrum resources in a same frequency band as the high priority level communication system, where N≥1. The impact of the transmission model can be taken into consideration in the case of using the number of exclusive systems as the exclusive index, which avoids unnecessary limitation on some low priority level communication systems.

Similarly, as a supplement to the number N of exclusive systems, the exclusive index may further include a frequency band which is defined in frequency domain and differs by a predetermined frequency range from a frequency used by the high priority level communication system. The first N communication systems which produce maximum interferences on the high priority level communication system are forbidden to make use of spectrum resources on the defined frequency band. Specifically, the predetermined frequency range may be represented by an integer multiple of a predefined frequency interval. It should be understood that although the exclusive index defined in frequency domain described above is only used a supplement, the exclusive index can also be used as an individual exclusive index.

Specifically, the number N of exclusive systems may be acquired according to a stochastic model of a distribution of positions of the communication systems and desired frequency usage efficiency of the high priority level communication system, which has been described specifically in the first embodiment, and is not repeated here anymore.

Although not shown in FIG. 6, in the case that the exclusive index is the number N of exclusive systems, the spectrum management method may further include: creating and maintaining, based on geographical positions of all communication systems in the management range, an interference neighbor list for each high priority level communication system, and determining an exclusive system involved by the exclusive index based on the interference neighbor list. The communication systems are ranked in a descending order based on interferences of the communication systems on the high priority level communication system in the interference neighbor list, and the communication system is stored in association with a priority level of the communication system in the interference neighbor list.

The exclusive indexes can be adjusted based on at least one of desired spectrum usage efficiency of the high priority level communication system and overall network capacity within the management range in step S12.

Furthermore, as illustrated by a dashed line block in FIG. 6, the spectrum management method may further include: receiving a request for using spectrum resources from a first communication system (S21), wherein, the exclusive index for the first communication system is determined in response to the request in the case that the first communication system is a high priority level communication system; and transmitting available spectrum resources and the exclusive index of the first communication to the first communication system (S22).

Specifically, in the case that the exclusive index for the first communication system involves an existing low priority level communication system, an instruction to adjust spectrum usage of the involved low priority level communication system is transmitted to the involved low priority level communication system in step S22.

In the case that the exclusive index for the first communication system involves an existing high priority level communication system and/or an exclusive index of an existing high priority level communication system involves the first communication system, the first communication system is notified that the exclusive index for the first communication system cannot be implemented in step S22.

In another example, information about the existing high priority level communication systems is transmitted to the first communication system in step S22, to be used by the first communication system to determine whether the exclusive index can be implemented.

In step S21, the request from the first communication system includes multiple sets of system parameter settings, and a set of system parameter settings with which it is most probable to acquire the spectrum resources based on exclusive indexes of the other high priority level communication systems is selected to be used in step S11. Information indicating the selection is transmitted to the first communication system in step S22.

Specifically, the system parameter setting may include at least one of an antenna pattern, a transmission mask, a modulation type and desired spectrum usage efficiency.

A communication system which is managed by the spectrum management method may be a cognitive radio communication system which makes opportunistic use of unlicensed spectrum, and a priority level of the communication system is determined based on a type of an application.

With the spectrum usage method according to the present disclosure, the exclusive index can be adjusted dynamically, and spectrum usage efficiency of the whole network can be improved on the premise of ensuring communication quality of the high priority level communication systems.

Fourth Embodiment

Figure 7:
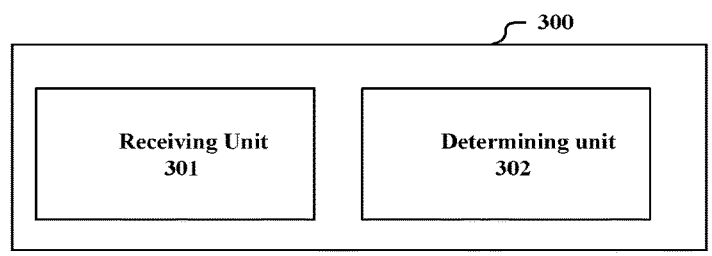
FIG. 7 is a structural block diagram of an apparatus for wireless communications according to an embodiment of the present disclosure.

FIG. 7 shows a structural block diagram of an apparatus 300 for wireless communications according to an embodiment of the present disclosure. The apparatus 300 includes: a receiving unit 301, configured to receive available spectrum resources and an exclusive index for a communication system where the apparatus 300 for wireless communications is located from a spectrum management apparatus, wherein the exclusive index is the number N of exclusive systems for the communication system where the apparatus 300 is located, and the first N communication systems which produce maximum interferences on the communication system where the apparatus 300 is located are forbidden to make use of spectrum resources in a same frequency band as the available spectrum resources, where N≥1; and a determining unit 302, configured to determine an interference neighbor list of the communication system, and determine an exclusive system based on the interference neighbor list and the exclusive index.

The apparatus 300 is used to communicate with the spectrum management apparatus to receive information about the available spectrum resources and the exclusive index, and determine an exclusive system based on the exclusive index. In the embodiment, the exclusive index is the number N of exclusive systems, for example, which is determined by the spectrum management apparatus based on the way described in the first embodiment. The determining unit 302 determines the interference neighbor list and searches the interference neighbor list for the first N communication systems which produce maximum interferences, and determines the first N communication systems as the exclusive systems.

Figure 8:
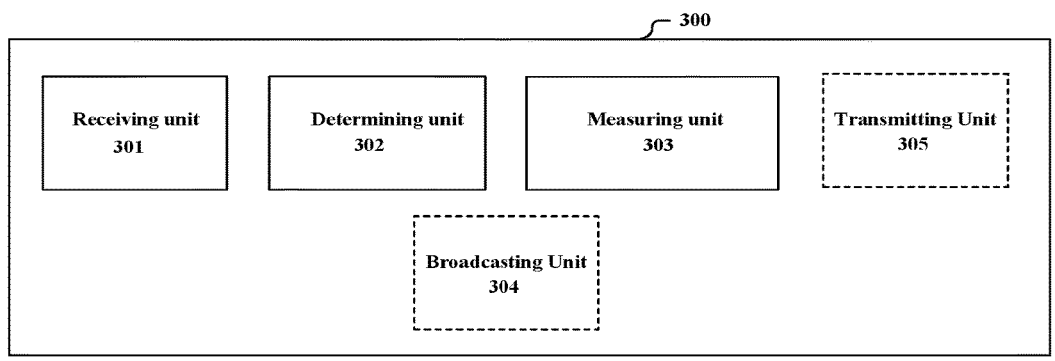
FIG. 8 is a structural block diagram of an apparatus for wireless communications according to another embodiment of the present disclosure.

In an example, the interference neighbor list is acquired by performing spectrum monitoring. Specifically, as shown in FIG. 8, the apparatus 300 may further include a measuring unit 303 configured to perform spectrum monitoring, to acquire interferences of each neighboring communication system on the communication system where the apparatus 300 is located. For example, in a LTE system, the measuring unit 303 may perform spectrum monitoring based on a reference signal of a physical cell ID (PCI) of each neighboring communication system. In addition, for a multi-frequency system, a frequency band on which the spectrum monitoring is performed is generally lower than a frequency band of the available spectrum resources, this is because transmission characteristics are better in the lower frequency band, and it is easier to perform neighbor discovery.

In the case that the exclusive index is to be implemented by the communication system itself, the communication system further requires to know the spectrum usage priority level of each neighboring communication system to determine whether there is a high priority level communication system in the determined exclusive systems. However, all communication systems in the existing system have the same spectrum usage priority level, and one can not determine which system is a high priority level communication system by an ID of the system, for example.

In an example, the receiving unit 301 may be configured to receive priority level information about each neighboring communication system from the spectrum management apparatus. That is, the priority level information about each communication system is managed by the spectrum management apparatus collectively. In the case that a new system accesses to the spectrum management apparatus to request using spectrum resources, the spectrum management apparatus notifies the new system of priority level information about the existing communication systems. The determining unit 302 determines an interference neighbor list using the priority level information and interferences incurred by the communication systems acquired by the measuring unit 303. The determined interference neighbor list at this time includes information about spectrum usage priority level of each neighboring communication system. In addition, the spectrum management apparatus may transmit a physical cell ID of the high priority level communication system to the receiving unit 301. The receiving unit acquires priority level information about a cell by comparing an existing cell ID measured by the measuring unit with a high priority level cell ID list.

In another example, the following way may also be used: the measuring unit 303 is configured to monitor a signal broadcasted by a neighboring communication system, and the signal includes information about the spectrum usage priority level of the neighboring communication system. Moreover, the measuring unit 303 takes a signal intensity of the signal as characterization for the size of interferences, and the determining unit 302 determines the interference neighbor list based on the information and the size of the interferences acquired by the measuring unit 303.

In the example, the apparatus 300 may further include a broadcasting unit 304 configured to transmit broadcast signaling at a predetermined period, to notify the neighboring communication systems of information about the spectrum usage priority level of the communication system where the apparatus 300 is located, as shown by a dashed-line block in FIG. 8.

In addition, as shown by another dashed-line block in FIG. 8, the apparatus 300 may further include a transmitting unit 305 configured to transmit a request for adjusting spectrum usage of low priority level communication systems to the spectrum management apparatus, in the case that all of the N exclusive systems determined by the determining unit 302 are low priority level communication systems. In other words, the exclusive index is implemented by the spectrum management apparatus.

Alternatively, the transmitting unit 305 may be configured to transmit to the low priority level communication systems an instruction to adjust spectrum resources used by low priority level communication systems, in the case that all of the N exclusive systems determined by the determining unit 302 are low priority level communication systems. In other words, the exclusive index is implemented by the communication system itself. In this case, the transmitting unit 305 may transmit the instruction described above through at least one of the following manners: transmitting via an X2 interface; and communication directly via D2D.

The communication system where the apparatus 300 is located is unable to operate as a high priority level communication system, in the case that there is high priority level communication system among the N exclusive systems determined by the determining unit 302.

It should be understood that, for example, the apparatus 300 may be located in a base station or a communication device of the communication system, or may be a separate management apparatus.

For ease of understanding, a non-limiting example of implementing the exclusive index (the number N of exclusive systems) is given below with reference to FIG. 2. Specifically, a high priority level communication system 0 receives available spectrum resources and an exclusive index N from the spectrum management apparatus, and N is equal to 1. An interference neighbor list, in which communication systems are ranked in a descending order according to the size of interferences of the communication systems, acquired by the communication system 0 through monitoring the broadcast signal, is described as follows: system 1—low priority level, system 2—low priority level, system 3—low priority level, and so on. Since the exclusive index N is equal to 1, that is, a first neighboring communication system can not be an intra-frequency system, and the first neighboring communication system 1 is a low priority level communication system, the exclusive index of the communication system 0 can be implemented. For example, an instruction to adjust spectrum usage of communication system 1 is transmitted to communication system 1 via an X2 interface.

The apparatus 300 for wireless communications according to the embodiment of the present disclosure can determine the interference neighbor list, determine the exclusive systems based on the interference neighbor list and the exclusive index acquired from the spectrum management apparatus, and can implement the exclusive index in the case of acquiring the priority level information of the system.

Fifth Embodiment

In the process of describing the apparatus for wireless communications in the embodiments described above, obviously, some processing and methods are also disclosed. Hereinafter, an overview of the methods is given without repeating some details disclosed above. However, it should be noted that, although the methods are disclosed in a process of describing the apparatus for wireless communications, the methods do not certainly employ or are not certainly executed by the aforementioned components. For example, the embodiments of the apparatus for wireless communications may be partially or completely implemented with hardware and/or firmware, the method for wireless communications described below may be executed by a computer-executable program completely, although the hardware and/or firmware of the electronic device can also be used in the methods.

Figure 9:
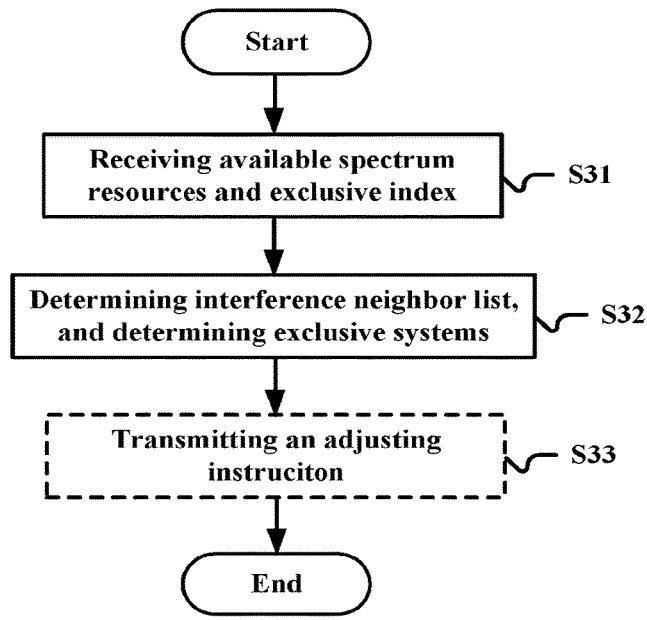
FIG. 9 is a flowchart of a method for wireless communications according to an embodiment of the present disclosure.

FIG. 9 shows a flowchart of a method for wireless communications according to an embodiment of the present disclosure, and the method includes: receiving available spectrum resources and an exclusive index for a target communication system from a spectrum management apparatus (S31), wherein the exclusive index is the number N of exclusive systems for the target communication system, the first N communication systems which produce maximum interferences on the target communication system is located are forbidden to make use of spectrum resources in a same frequency band as the available spectrum resources, where N≥1; and determining an interference neighbor list of the target communication system (S32), and determining an exclusive system based on the interference neighbor list and the exclusive index.

In step S32, interferences of each neighboring communication system on the target communication system are acquired by spectrum monitoring. For example, the spectrum monitoring can be performed based on a reference signal of a physical cell ID (PCI) of each neighboring communication system. For a multi-frequency system, a frequency band on which the spectrum monitoring is performed is lower than a frequency band of the available spectrum resources.

In an example, a signal broadcasted by the neighboring communication system is monitored in step S32, and the signal includes information about a spectrum usage priority level of the neighbor communication system. The signal intensity of the signal is taken as characterization for the size of the interferences, and an interference neighbor list is determined based on the information and the size of the interferences. Although not shown in FIG. 9, the method may further include transmitting broadcast signaling at a predetermined period, to notify the neighboring communication systems of information about a spectrum usage priority level of the target communication system.

The information about the priority level of each neighboring communication system may also be acquired from the spectrum management apparatus, and the interference neighbor list is determined in step S32 with the information about the priority level and the interferences incurred by the communication systems acquired by spectrum monitoring.

Returning to refer to FIG. 9, the spectrum management method may further include: transmitting to the low priority level communication systems an instruction to adjust spectrum resources used by low priority level communication systems, in the case that the N exclusive systems determined in step S32 only include the low priority level communication systems (S33). The instruction is transmitted through at least one of the following manners: transmitting via an X2 interface; and communication directly via D2D.

In addition, a request for adjusting spectrum usage of low priority level communication systems is transmitted to the spectrum management apparatus in step S33 in the case that the N exclusive systems determined in step S32 only include the low priority level communication systems.

The target communication system is unable to operate as a high priority level communication system, in the case that the N exclusive systems determined in step S32 include a high priority level communication system.

Figure 10:
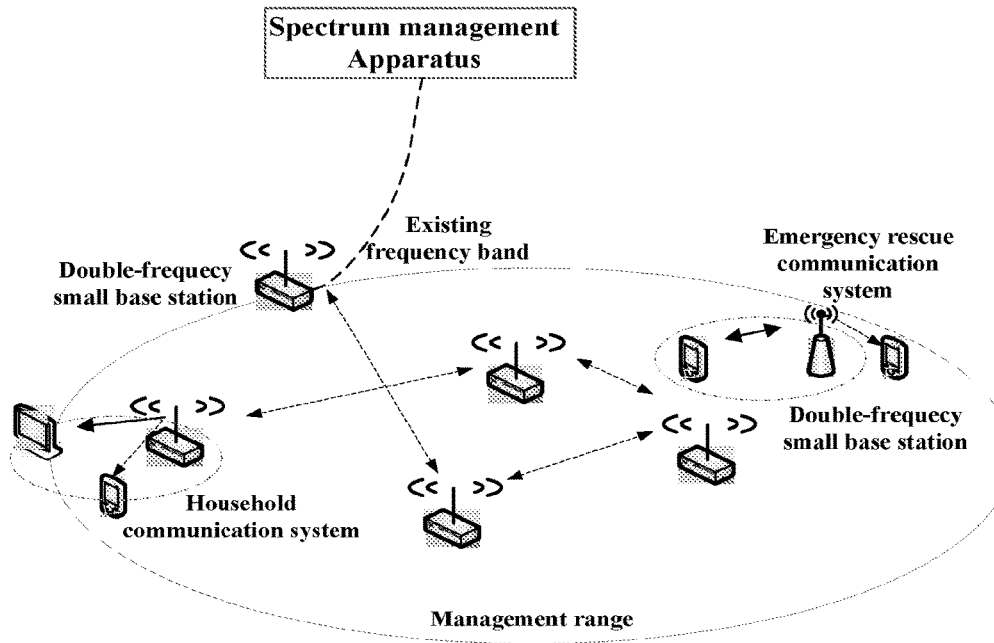
FIG. 10 is a schematic diagram of a system embodiment.

An operation of implementing an exclusive index in the case that the number of exclusive systems is used as the exclusive index according to the present disclosure is illustrated below by a specific system embodiment. As shown in FIG. 10, many LTE double-frequency small base stations are located within the management range of the spectrum management apparatus, and the small base stations can operate in an existing LTE frequency band and a new frequency band such as 3.5 GHz simultaneously. The small stations provide a wireless access network service such as household wireless network in the existing LTE frequency band. In addition, extra spectrum resources for example 3.5 GHz can be used if desired, to increase bandwidth of the system to provide an extra service, for example television video transmission. Some small base stations provide enough bandwidth for video transmission to rescuers in an emergency. In this case, the base station has a high spectrum usage priority level. The base station acquires available spectrum resources and an exclusive index N (for example, N is equal to 4) after accessing to the spectrum management apparatus.

The available spectrum resources are available spectrum resources of the small base station determined by the spectrum management apparatus based on protection for an existing radar system of 3.5 GHz. The exclusive index N is the number of exclusive systems, with which the desired spectrum usage efficiency of the small base stations can be realized, and the exclusive index is calculated by the spectrum management apparatus according to a mathematical model described above based on a density of the existing small base stations, assuming that the existing base stations can be switched on or switched off randomly or positions thereof can be changed randomly. N=4 means that the first four small base stations which produce maximum interferences on a high priority level small base station cannot make use of a same frequency band as the high priority level small base station.

For example, the high priority level small base station controls a user at the edge of the cell to perform measurement in the existing LTE frequency band, so as to perform spectrum monitoring on a neighboring small base station to acquire an ID of the neighboring small base station and an automatic neighbor relation function, and determine an order of the small base stations in a descending order based on the measured signal intensity. The small base station performs signaling interaction with the neighboring small base station for example via the LTE-X2 interface or direction communication similar to D2D, to cause the first four small base stations which produce maximum interferences to be unable to make use of spectrum resources in a same frequency as the small base station. For example, a High Interference Indication signal in LTE indicates that a user at the edge of the cell would use a resource block, and a neighboring cell will be interfered if using the same resource block. Therefore, the neighboring cell will avoid using the resource block.

In the case that a position of the small base station may be changed in a real-time manner, the base station responsible for emergency rescues may detect a neighbor small base station list periodically, and implement the exclusive index based on the newest list.

It should be understood that the system example is only for ease of understanding, and does not limit the present disclosure.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

It can be understood by those skilled in the art that for example the determining unit, the adjusting unit, the measuring unit and the like in the apparatus described above may be implemented with one or more processors, and for example the transmitting unit, the receiving unit, the broadcasting unit and the like in the apparatus described above may be implemented with a circuit component such as an antenna, a filter, a modem and a codec.

Therefore, an electronic device (1) is provided according to the present disclosure, which includes circuitry configured to: determine an exclusive index for a high priority level communications system within a management range, wherein the exclusive index represents a range of isolation of the high priority level communication system from other communication systems in space and/or in frequency domain; and in the case that there are multiple exclusive indexes, adjust the exclusive indexes.

An electronic device (2) is further provided according to the present disclosure, which includes circuitry configured to: receive available spectrum resources and an exclusive index for a target communication system from a spectrum management apparatus, wherein the exclusive index is the number N of exclusive systems for the target communication system, where the first N communication systems which produce maximum interferences on the target communication system are forbidden to make use of spectrum resources in a same frequency band as the available spectrum resources, where N≥1; and determine an interference neighbor list of the target communication system, and determine the exclusive systems based on the interference neighbor list and the exclusive index.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 1100 shown in FIG. 11) from a storage medium or network, wherein the computer is capable of implementing various functions when installed with various programs.

Figure 11:
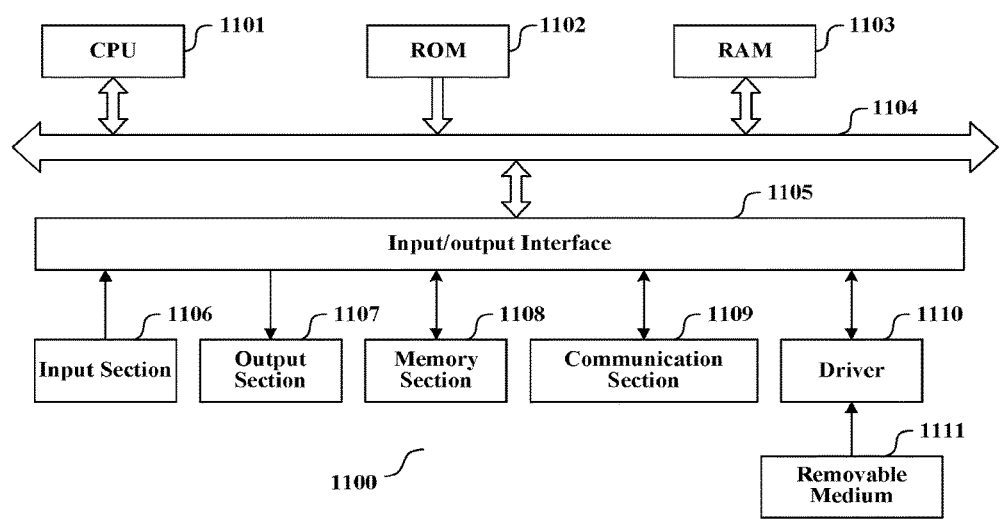
FIG. 11 is an exemplary block diagram illustrating the structure of a general purpose personal computer capable of realizing the method and/or device and/or system according to the embodiments of the present invention.

In FIG. 11, a central processing unit (CPU) 1101 executes various processing according to a program stored in a read-only memory (ROM) 1102 or a program loaded to a random access memory (RAM) 1103 from a memory section 1108. The data needed for the various processing of the CPU 1101 may be stored in the RAM 1103 as needed. The CPU 1101, the ROM 1102 and the RAM 1103 are linked with each other via a bus 1104. An input/output interface 1105 is also linked to the bus 1104.

The following components are linked to the input/output interface 1105: an input section 1106 (including keyboard, mouse and the like), an output section 1107 (including displays such as a cathode ray tube (CRT), a liquid crystal display (LCD), a loudspeaker and the like), a memory section 1108 (including hard disc and the like), and a communication section 1109 (including a network interface card such as a LAN card, modem and the like). The communication section 1109 performs communication processing via a network such as the Internet. A driver 1110 may also be linked to the input/output interface 1105. If needed, a removable medium 1111, for example, a magnetic disc, an optical disc, a magnetic optical disc, a semiconductor memory and the like, may be installed in the driver 1110, so that the computer program read therefrom is installed in the memory section 1108 as appropriate.

In the case where the foregoing series of processing is achieved by software, programs forming the software are installed from a network such as the Internet or a memory medium such as the removable medium 1111.

It should be appreciated by those skilled in the art that the memory medium is not limited to the removable medium 1111 shown in Figure, which has program stored therein and is distributed separately from the apparatus so as to provide the programs to users. The removable medium 1111 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1102 and the memory section 1108 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. A spectrum management apparatus, comprising:
   processing circuitry, configured to:
   determine an exclusive index for a high priority level communication system existing within a management range of the spectrum management apparatus, wherein the exclusive index represents a range of isolation of the high priority level communication system from other communication systems in space and/or in frequency domain; and when there are a plurality of exclusive indexes, adjust the exclusive indexes, wherein the processing circuitry is further configured to:
receive a request for making use of spectrum resources from a first communication system, wherein the processing circuitry is configured to determine the exclusive index for the first communication system in response to the request, when the first communication system is a high priority level communication system; and
transmit available spectrum resources and the exclusive index for the first communication system to the first communication system.

2. The spectrum management apparatus according to claim 1, wherein
when the exclusive index for the first communication system involves an existing low priority level communication system, the processing circuitry is further configured to transmit to the involved low priority level communication system an instruction to adjust spectrum usage of the involved low priority level communication system.

3. The spectrum management apparatus according to claim 1, wherein
when the exclusive index for the first communication system involves an existing high priority level communication system and/or the exclusive index of an existing high priority level communication system involves the first communication system, the processing circuitry is further configured to notify the first communication system that the exclusive index for the first communication system cannot be implemented.

4. The spectrum management apparatus according to claim 1, wherein
the request from the first communication system comprises a plurality of sets of system parameter settings, and the processing circuitry is further configured to select to use, based on exclusive indexes of other high priority level communication systems, a set of system parameter settings, with which it is most probable to acquire the available spectrum resources, and transmit information indicating the selection to the first communication system.

5. The spectrum management apparatus according to claim 4, wherein
the system parameter settings comprise at least one of an antenna pattern, a transmission mask, a modulation type, and desired spectrum usage efficiency.

6. The spectrum management apparatus according to claim 1, wherein
the processing circuitry is further configured to adjust the exclusive indexes based on at least one of desired spectrum usage efficiency of the high priority level communication system and overall network capacity within the management range.

7. The spectrum management apparatus according to claim 1, wherein
the exclusive index is an exclusive region in space based on a geographical position, wherein the other communication systems in the exclusive region are unable to make use of spectrum resources in a same frequency band as the high priority level communication system.

8. The spectrum management apparatus according to claim 1, wherein
the exclusive index is a number N of exclusive systems, wherein the first N communication systems which produce maximum interferences on the high priority level communication system are unable to make use of spectrum resources in a same frequency band as the high priority level communication system, wherein N≥1.

9. The spectrum management apparatus according to claim 8, wherein
the processing circuitry is further configured to create and maintain, based on geographical positions of all communication systems within the management range of the spectrum management apparatus, an interference neighbor list for each high priority level communication system, and determine, based on the interference neighbor list, the exclusive systems involved by the exclusive index, wherein the communication systems are ranked in a descending order in accordance with interferences of the communication systems on the high priority level communication system in the interference neighbor list, and each communication system is stored in association with a priority level of the communication system in the interference neighbor list.

10. An apparatus for wireless communications, comprising:
processing circuitry, configured to:
receive available spectrum resources and an exclusive index for a communication system where the apparatus for wireless communications is located from a spectrum management apparatus, wherein the exclusive index is a number N of exclusive systems for the communication system where the apparatus is located, wherein the first N communication systems which produce maximum interferences on the communication system where the apparatus is located are unable to make use of spectrum resources in a same frequency band as the available spectrum resources, wherein N≥1; and
determine an interference neighbor list of the communication system, and determine the exclusive systems based on the interference neighbor list and the exclusive index.

11. The apparatus according to claim 10, wherein the processing circuitry is further configured to:
monitor spectrum to acquire interferences of each neighboring communication system on the communication system where the apparatus is located.

12. The apparatus according to claim 11, wherein
the processing circuitry is further configured to monitor spectrum based on a reference signal of a physical cell ID of each neighboring communication system.

13. The apparatus according to claim 10, wherein
the processing circuitry is further configured to receive priority level information about each neighboring communication system, and determine the interference neighbor list using the priority level information and the interferences incurred by the communication system acquired by the processing circuitry.

14. The apparatus according to claim 11, wherein
the processing circuitry is further configured to monitor a signal broadcasted by the neighboring communication system, the signal containing information about a spectrum usage priority level of the neighboring communication system, take a signal intensity of the signal as characterization for a size of interferences, and determine the interference neighbor list based on the information and the size of the acquired interferences.

15. The apparatus according to claim 13, wherein
the processing circuitry is further configured to, when all of the determined N exclusive systems are low priority level communication systems, transmit to the low priority level communication systems an instruction to adjust spectrum resources used by the low priority level communication systems.

16. The apparatus according to claim 13, the processing circuitry is further configured to, when all of the determined N exclusive systems are low priority level communication systems, transmit to the spectrum management apparatus a request for adjusting spectrum usage of the low priority level communication systems.

17. The apparatus according to claim 13, wherein the processing circuitry is further configured to:
transmit broadcasting signaling at a predetermined period, to notify the neighboring communication systems of information about a spectrum usage priority level of the communication system where the apparatus is located.

18. A spectrum management method, comprising:
determining an exclusive index for a high priority level communication system existing within a management range, wherein the exclusive index represents a range of isolation of the high priority level communication system from other communication systems in space and/or in frequency domain;
when there are a plurality of exclusive indexes, adjusting the exclusive indexes,
receiving a request for making use of spectrum resources from a first communication system, and determining the exclusive index for the first communication system in response to the request when the first communication system is a high priority level communication system; and
transmitting available spectrum resources and the exclusive index for the first communication system to the first communication system.

19. A method for wireless communications, comprising:
receiving available spectrum resources and an exclusive index for a target communication system from a spectrum management apparatus, wherein the exclusive index is a number N of exclusive systems for the target communication system, wherein the first N communication systems which produce maximum interferences on the target communication system are forbidden to make use of spectrum resources in a same frequency band as the available spectrum resources, where $N \geq 1$; and
determining an interference neighbor list of the target communication system, and determining the exclusive systems based on the interference neighbor list and the exclusive index.

\* \* \* \* \*